(12) United States Patent
Huang et al.

(10) Patent No.: US 12,443,440 B2
(45) Date of Patent: Oct. 14, 2025

(54) METHOD FOR EXECUTING DATA PROCESSING TASK IN CLUSTER MIXED DEPLOYMENT SCENARIO, ELECTRONIC DEVICE AND STORAGE MEDIUM

(71) Applicant: Beijing Volcano Engine Technology Co., Ltd., Beijing (CN)

(72) Inventors: Zhaowei Huang, Beijing (CN); Kejian Ju, Beijing (CN); Leilei Hu, Beijing (CN)

(73) Assignee: Beijing Volcano Engine Technology Co., Ltd., Beijing (CN)

(*) Notice: Subject to any disclaimer, the term of this patent is extended or adjusted under 35 U.S.C. 154(b) by 0 days.

(21) Appl. No.: 18/934,437

(22) Filed: Nov. 1, 2024

(65) Prior Publication Data

US 2025/0147801 A1   May 8, 2025

(30) Foreign Application Priority Data

Nov. 2, 2023  (CN) .......................... 202311452596.4

(51) Int. Cl.
*G06F 9/48* (2006.01)
*G06F 9/50* (2006.01)

(52) U.S. Cl.
CPC .......... *G06F 9/4881* (2013.01); *G06F 9/5016* (2013.01)

(58) Field of Classification Search
CPC ................. G06F 9/4881; G06F 9/5016; G06F 2209/5022; G06F 2209/504; G06F 2209/508; G06F 9/5022
See application file for complete search history.

(56) References Cited

U.S. PATENT DOCUMENTS 7,668,100 B2 * 2/2010 Balasaygun ........ H04L 65/1104
370/235
11,451,615 B1 * 9/2022 Scrivano ................. H04L 67/02
(Continued)

FOREIGN PATENT DOCUMENTS

| CN | 103167034 B | 11/2015 |
|---|---|---|
| CN | 105094997 B | 5/2018 |
| CN | 114218004 A | 3/2022 |

OTHER PUBLICATIONS

Li, et al. "A Task Scheduling Algorithm for Micro-cloud Platform Based on Task Real-time." Proceedings of the 2023 2nd International Conference on Networks, Communications and Information Technology, pp. 196-200. (Year: 2023).*

*Primary Examiner* — Aimee Li
*Assistant Examiner* — Willy W Huaracha
(74) *Attorney, Agent, or Firm* — Alleman Hall & Tuttle LLP (57) ABSTRACT

A method and an apparatus for executing a data processing task in a cluster mixed deployment scenario and a device are provided. A first electronic device is provided with computing nodes of at least two data engines. A specific implementation of the method includes: in response to a first data engine node receiving a first data processing task, determining a first memory occupancy corresponding to the first data processing task, where the first data engine node is deployed on the first electronic device and belongs to a first data engine; and determining whether to execute the first data processing task based on a second memory occupancy corresponding to another data engine node, where the another data engine node is deployed on the first electronic device and belongs to another data engine other than the first data engine in the at least two data engines.

14 Claims, 7 Drawing Sheets

(56) References Cited

U.S. PATENT DOCUMENTS

| | | | |
|---|---|---|---|
| 2015/0227388 A1* | 8/2015 | Liang | G06F 9/4818 |
| | | | 718/107 |
| 2016/0124672 A1* | 5/2016 | Qiu | G06F 9/50 |
| | | | 711/154 |
| 2017/0032016 A1* | 2/2017 | Zinner | G06Q 10/067 |
| 2023/0195481 A1* | 6/2023 | Chen | G06F 9/4887 |
| | | | 718/1 |
| 2025/0021552 A1* | 1/2025 | Ding | G06F 16/248 |

* cited by examiner

METHOD FOR EXECUTING DATA PROCESSING TASK IN CLUSTER MIXED DEPLOYMENT SCENARIO, ELECTRONIC DEVICE AND STORAGE MEDIUM

CROSS-REFERENCE TO RELATED APPLICATION

The present application claims priority of Chinese Patent Application No. 202311452596.4, filed on Nov. 2, 2023, the disclosure of which is hereby incorporated herein by reference in its entirety as part of the present disclosure.

TECHNICAL FIELD

The present disclosure relates to the field of computer technologies, and in particular, to a method and an apparatus for executing a data processing task in a cluster mixed deployment scenario, an electronic device, and a storage medium.

BACKGROUND

With the development of computers, users can use electronic devices to implement various functions. For example, users can query various data through electronic devices.

In some scenarios, a plurality of different engines may be deployed in a big data system, each data engine may have a set of master-slave process frameworks, and in order to improve resource utilization rate of the cluster, nodes of engines used in different scenarios may be deployed on a same electronic device or a same virtual machine. The scenario in which components of a plurality of data engines are deployed on a same electronic device or a same virtual machine is referred to as cluster mixed deployment (namely, mixed deployment cluster).

SUMMARY

This section is provided to give a brief overview of concepts, which will be described in detail in the section of detailed description of embodiments. This section is neither intended to identify key or necessary features of the claimed technical solutions, nor is it intended to be used to limit the scope of the claimed technical solutions.

According to an aspect, an embodiment of the present disclosure provides a method for executing a data processing task in a cluster mixed deployment scenario, and the method comprises: in response to a first data processing task for a first data engine node of a first data engine, determining a first memory occupancy corresponding to the first data processing task, wherein the first data engine node is deployed on a first electronic device, and the first electronic device is provided with a plurality of computing nodes including the first data engine node, and the plurality of computing nodes belong to at least two data engines including the first data engine; and determining, based on the first memory occupancy and a memory occupancy corresponding to at least some of the plurality of computing nodes, whether to execute the first data processing task.

According to an aspect, an embodiment of the present disclosure provides an apparatus for executing a data processing task in a cluster mixed deployment scenario, and the apparatus comprises: a first determining unit, configured to determine, in response to a first data processing task for a first data engine node of a first data engine, a first memory occupancy corresponding to the first data processing task, wherein the first data engine node is deployed on a first electronic device, and the first electronic device is provided with a plurality of computing nodes including the first data engine node, and the plurality of computing nodes belong to at least two data engines including the first data engine; and a second determining unit, configured to determine, based on the first memory occupancy and a memory occupancy corresponding to at least some of the plurality of computing nodes, whether to execute the first data processing task.

According to an aspect, an embodiment of the present disclosure provides an electronic device, which comprises: one or more processors; and a storage apparatus, storing one or more programs, wherein the one or more programs, when executed by the one or more processors, cause the one or more processors to implement the method for executing a data processing task in a cluster mixed deployment scenario according to the above aspect.

According to an aspect, an embodiment of the present disclosure provides a non-transitory computer-readable medium having a computer program stored thereon, wherein the program, when executed by a processor, implements steps of the method for executing a data processing task in a cluster mixed deployment scenario according to the above aspect.

BRIEF DESCRIPTION OF DRAWINGS

The above and other features, advantages, and aspects of embodiments of the present disclosure will become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

The embodiments of the present disclosure will be described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first", "second", etc. mentioned in the present disclosure are only used to distinguish different apparatuses, modules, or units, and are not used to limit the sequence of functions performed by these apparatuses, modules, or units or interdependence thereof.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

In one or more embodiments of the present disclosure, a plurality of different engines may be deployed in a big data system, for example, a distributed storage system HDFS for storing data, a big data resource scheduling system YARN for computing, and an online analytical processing (OLAP) system for data query. Each data engine may have a set of master-slave process frameworks. In order to improve resource utilization rate of the cluster, nodes of engines used in different scenarios may be deployed on a same electronic device or a same virtual machine. The scenario in which components of a plurality of data engines are deployed on a same electronic device or a same virtual machine may be referred to as cluster mixed deployment (namely, mixed deployment cluster).

Figure 2A:
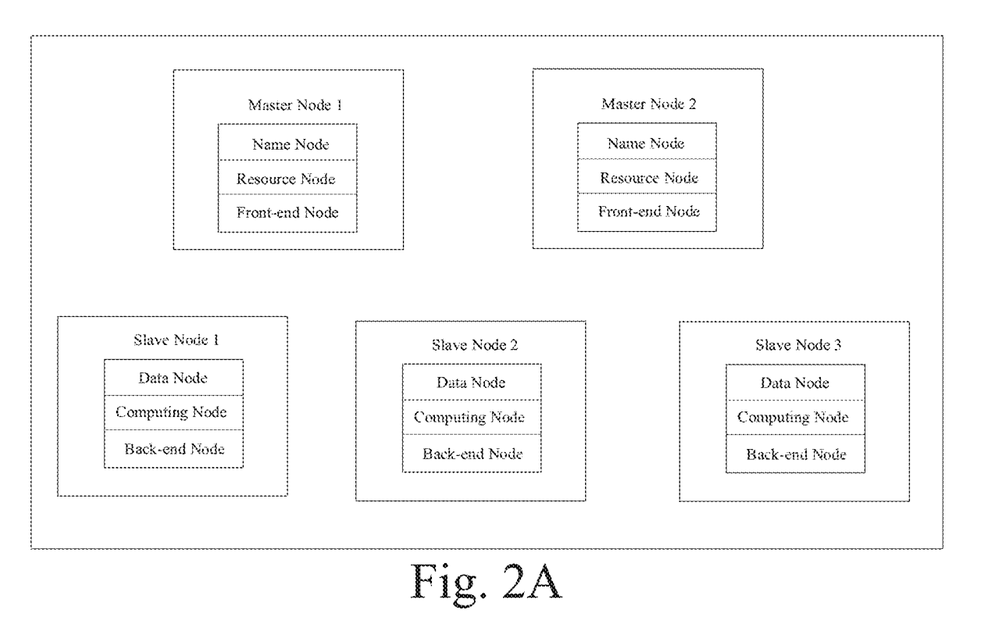
FIG. 2A and FIG. 2B are schematic diagrams of an exemplary scenario according to the present disclosure.

In one or more embodiments of the present disclosure, referring to FIG. 2A, FIG. 2A shows a big data cluster mixed deployment scenario. Components herein include HDFS, YARN, and an OLAP system (for example, Doris). When the cluster is connected to a network, the cluster is divided into a master node and a slave node (core node). The master node is generally used as a metadata node, and generally uses a memory-type server. A large memory is used to ensure metadata. The slave node generally uses a computing server, and has a large number of CPU cores for computing. On the master node, central nodes of three services are deployed, for example, a name node (also referred to as a Name Node) of HDFS, a resource node (also referred to as a Resource Manager) of Yarn, and a front-end node (also referred to as an FE) of Doris. On the slave node, computing nodes of the three services are deployed, for example, a data node of HDFS, a computing node (also referred to as a Node Manager) of Yarn, and a back-end node (also referred to as a BE node) of Doris. Certainly, in an actual cluster, there are often more processes than these three, for example, a Spark computing process derived from a computing node of Yarn is also in the computing node. In addition, there are cluster-level management and control programs, for example, processes such as a monitoring acquisition task and a node agent are deployed on a node.

However, in the cluster mixed deployment, resource contention on the node becomes more intense. Core resources on the node include a CPU, a memory, a disk, a network, and the like.

An operating system generally has a scheduling capability for process and thread. Therefore, even if CPU contention is more intense, only a risk of a latency reduction is caused. Similarly, for the disk and the network, even if contention is busy, the task is only blocked. However, an impact caused by memory contention is more serious.

Because the swap partition of Linux is closed in most big data systems, the virtual memory and the physical memory of the operating system are basically in a one-to-one correspondence. The Linux system has a capability of forced memory overflow stop (namely, an OOM Killer). Once the physical memory rises to an upper limit of a memory of the node, the operating system actively searches for a process with a high score, and forcibly stops the process. This is a huge blow to these management and control services of the big data. For example, if a back-end node is forcibly stopped, query tasks on this node all fail. If a computing node of Yarn is forcibly stopped, all derived tasks on this node need to be restarted. This has a relatively large impact on stability of the big data system.

Figure 2B:
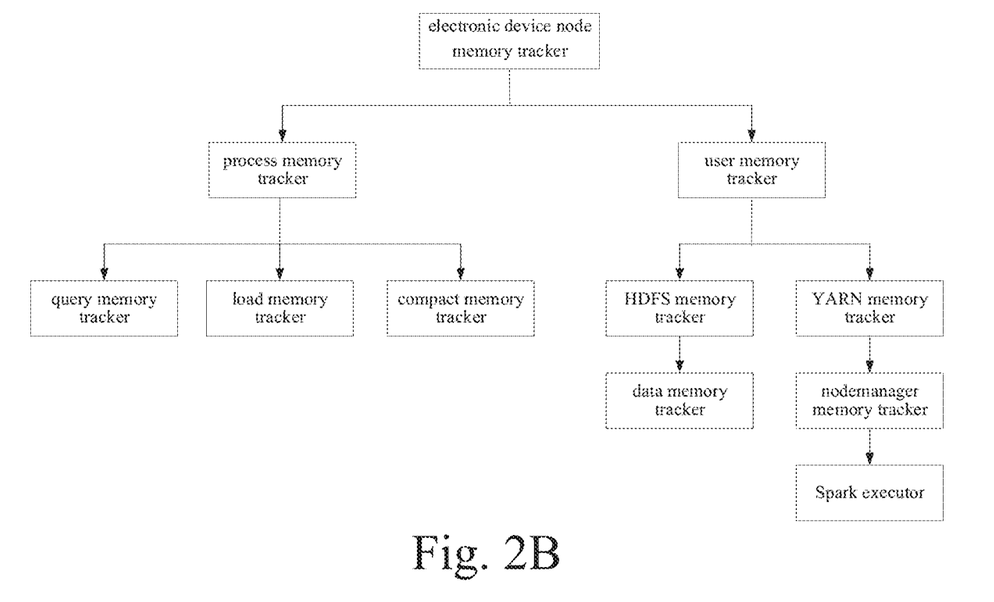

In one or more embodiments of the present disclosure, referring to FIG. 2B, FIG. 2B shows a scenario of tracking a memory occupancy in an electronic device. A dotted-line box shows a process memory tracker of an OLAP engine. The process memory tracker is deployed for the node of the OLAP engine. The process memory tracker may include trackers set for different types of processing requests, for example, a query memory tracker (for a processing query request), a load memory tracker (for a download request), and a compact memory tracker (for a memory compacting request). The memory tracker can not only monitor use of the process memory, but also control the memory application action, so as to prevent excessive memory application. Once the memory use exceeds the limit of any one of the memory trackers, the current task is canceled. For example, for a single query, if the limit of the query memory tracker is triggered, it is reported that the memory use of the single query task exceeds the limit. If the current query triggers the process memory tracker, it is reported that the process memory exceeds the limit.

In one or more embodiments of the present disclosure, an electronic device node memory tracker is further added to an upper layer of the process memory tracker of the OLAP engine. The node memory tracker does not monitor the memory of all processes on the node, but monitor processes of some data engines through a configuration item. For example, as shown in FIG. 2B, the memory generated by an HDFS process and a YARN process is used. Through a memory tracking method, memory amounts used by all processes created by HDFS and YARN are all counted in a user memory tracker at regular time intervals. An HDFS memory tracker and a YARN memory tracker may be set. The HDFS memory tracker can summarize the memory occupancy tracked by a data memory tracker set in a data node of the HDFS. The YARN memory tracker can summarize the memory occupancy tracked by a nodemanager memory tracker set for the nodemanager in the YARN. For example, the nodemanager memory tracker may count the memory amount occupied by a Spark computing process derived from a Yarn node manager, as shown in a Spark executor.

In one or more embodiments of the present disclosure, when an OLAP query occurs, the query task actively queries the memory use of the current node memory tracker. If a currently applied memory plus a currently used memory in the node memory tracker exceeds the preset limit, the query task fails and releases the memory occupied by the query task. If the HDFS and YARN memory use exceeds a preset setting, the entire node memory may exceed an upper limit. Through adding the node memory tracker, in the mixed deployment scenario, use of the OLAP memory can be adaptively limited, thereby improving cluster utilization rate and stability of the computing service.

In one or more embodiments of the present disclosure, all physical memories used by a user (data engine) may be returned according to the user. The user memory tracker concurrently executes a statistics command every 500 milliseconds, returns occupied memories, and updates the occupied memories in a memory count of the tracker. Then, all memory applications calculate the memory use.

The method and apparatus for executing a data processing task in a cluster mixed deployment scenario and the device according to the embodiments of the present disclosure can determine, in response to a first data engine node receiving a first data processing task, a first memory occupancy corresponding to the first data processing task, where the first data engine node is deployed on a first electronic device and belongs to a first data engine, and can determine whether to execute the first data processing task based on a second memory occupancy corresponding to another data engine node, where the another data engine node is deployed on the first electronic device and belongs to another data engine other than the first data engine in the at least two data engines. In this way, in the cluster mixed deployment scenario, whether to execute the first data processing task can be determined based on memories occupied by the computing nodes of the plurality of data engines, so that flexible memory allocation in the first electronic device is ensured, and task execution interruption caused by memory overuse is avoided, thereby improving stability of the service provided by a system.

Figure 1:
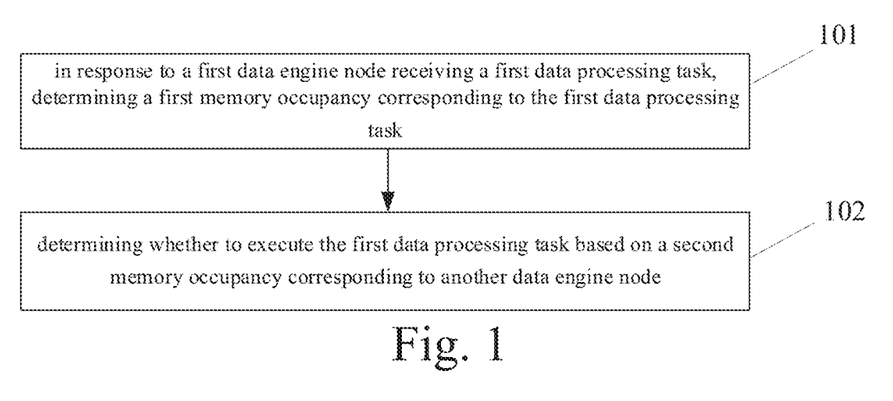
FIG. 1 is a flowchart of a method for executing a data processing task in a cluster mixed deployment scenario according to an embodiment of the present disclosure.

Referring to FIG. 1, which shows a flow of a method for executing a data processing task in a cluster mixed deployment scenario according to an embodiment of the present disclosure. As shown in FIG. 1, the method for executing a data processing task in a cluster mixed deployment scenario includes the following steps.

Step 101: in response to a first data engine node receiving a first data processing task, determining a first memory occupancy corresponding to the first data processing task.

In this embodiment, an execution subject (for example, a server and/or a terminal device) of the method for executing a data processing task in a cluster mixed deployment scenario may determine a first memory occupancy corresponding to a first data processing task in response to a first data engine node receiving the first data processing task.

Here, a first electronic device is provided with computing nodes of at least two data engines, and the first data engine node is deployed on the first electronic device and belongs to a first data engine. In other words, the plurality of data engines may arrange the computing nodes on the first electronic device. A process created by the computing nodes may run on the first electronic device, and the process may occupy a memory of the first electronic device when running.

Here, the first electronic device may be an electronic device in a service cluster, for example, a server. The first electronic device may be a physical machine or a virtual machine. In other words, the first electronic device may be a device in a hardware concept or a device in a software concept.

The first data engine may be any data engine whose node is deployed on the first electronic device.

Optionally, the first data engine may be an online analytical processing (OLAP) engine. In the present disclosure, the first data engine is taken as the OLAP engine as an example for description.

For example, referring to FIG. 2A, on a core node, computing nodes of three services may be deployed, for example, a data node of HDFS, a node manager of Yarn, and a back-end node (BE node) of Doris.

The first data processing task may be any type of data processing task, such as a query task, a modification task, a download task, or the like.

Optionally, the memory occupancy corresponding to the first data processing task may be an applied memory occupancy or an estimated memory occupancy.

Step 102: determining whether to execute the first data processing task based on a second memory occupancy corresponding to another data engine node.

Here, another data engine node is deployed on the first electronic device and belongs to another data engine other than the first data engine in the at least two data engines.

Here, whether to execute the first data processing task may be determined based on the memory occupancies corresponding to all or some of other data engine nodes.

For example, whether to execute the first data processing task may be determined based on a sum of the first memory occupancy and memory occupancies corresponding to all the computing nodes. If the sum of the first memory occupancy and the memory occupancies corresponding to all the computing nodes is less than a preset threshold, the first data processing task is executed. If the sum of the first memory occupancy and the memory occupancies corresponding to all the computing nodes is not less than the preset threshold, the first data processing task is canceled, that is, the first data processing task is not executed. If the first data processing task has occupied some memory, the occupied memory is released.

It should be noted that the task execution manner provided in this embodiment can determine, in response to a first data engine node receiving a first data processing task, a first memory occupancy corresponding to the first data processing task, where the first data engine node is deployed on a first electronic device and belongs to a first data engine; and determine whether to execute the first data processing task based on a second memory occupancy corresponding to another data engine node, where the another data engine node is deployed on the first electronic device and belongs to another data engine other than the first data engine in the at least two data engines. In this way, in the cluster mixed deployment scenario, whether to execute the first data processing task is determined based on memories occupied by the computing nodes of the plurality of data engines, so that flexible memory allocation in the first electronic device is ensured, and task execution interruption caused by memory overuse is avoided, thereby improving stability of the service provided by a system.

In some embodiments, the step 102 may include following operations. Determining whether to execute the first data processing task based on a second memory occupancy corresponding to another data engine node comprises: determining the second memory occupancy and determining a third memory occupancy corresponding to the first data engine node; and determining whether to execute the first data processing task based on the second memory occupancy and the third memory occupancy.

Here, the second memory occupancy comprises a memory amount occupied by a running process in processes created by other data engine nodes.

Here, the third memory occupancy comprises a memory amount occupied by a running process in processes created by the first data engine node.

In some embodiments, memory occupancies of the at least two data engines deployed on the first electronic device are determined through a first step.

In some embodiments, the first step may include: determining, in processes running on the first electronic device, running processes created by the computing nodes of the data engines; summing, according to the computing nodes to which the running processes belong, memory amounts occupied by the determined running processes to obtain memory occupancies corresponding to respective computing nodes; summing memory amounts corresponding to the computing nodes according to the data engines to which the computing nodes belong; and storing memory occupancies corresponding to respective data engines that are obtained in each acquisition step.

Here, a data engine identifier of a data engine whose memory occupancy is to be tracked may be pre-stored in a configuration file.

Here, the data engine indicated by the data engine identifier in the configuration file may be used as a target data engine.

Here, the acquisition step may be performed periodically. In other words, the acquisition step may be performed at preset time intervals.

Here, the acquisition step may include: determining, in processes running on the first electronic device, running processes created by the computing nodes of the target data engine; and summing, according to the computing nodes to which the running processes belong, memory amounts occupied by the determined running processes to obtain a memory occupancy corresponding to each computing node.

Here, the memory occupancy of each computing node that is obtained in each acquisition step is stored. Then, the memory amounts corresponding to the computing nodes may be summed according to the data engines to which the computing nodes belong.

Here, memory amounts occupied by processes of the data processing engines are acquired at regular time intervals, the memory occupancies of the computing nodes are counted according to the computing nodes, the memory occupancies of the computing nodes are stored in files corresponding to the computing nodes, the memory occupancies of the computing nodes are summed, and memory occupancies corresponding to the data engines are stored in corresponding files.

Determining the second memory occupancy and determining a third memory occupancy corresponding to the first data engine node comprises: in response to the first data engine node receiving the first data processing task, obtaining memory occupancies corresponding to respective data engines that are determined based on an acquisition step that is closest to the current time.

In this way, when a latest memory occupancy corresponding to the data engine needs to be acquired, the latest memory occupancy can be conveniently acquired from a corresponding file, and the second memory occupancy and/or the third memory occupancy can be quickly determined, thereby improving the speed of determining whether to execute the first data processing task.

In some embodiments, the method further comprises: determining a first task type threshold corresponding to a first task type according to the first task type to which the first data processing task belongs.

Here, different task type thresholds may be set for different types of data processing tasks. If a memory occupied by a task is not less than a corresponding task type threshold, the task is not executed.

In some embodiments, determining, based on the first memory occupancy and memory occupancies corresponding to at least some of the plurality of computing nodes, whether to execute the first data processing task comprises: in response to the first memory occupancy being less than the first task type threshold, determining, based on the first memory occupancy and memory occupancies corresponding to at least some of the plurality of computing nodes, whether to execute the first data processing task.

Here, if the first memory occupancy is not less than the first task type threshold, the first data processing task is not executed.

Here, if the first memory occupancy is not less than the first task type threshold, subsequent determination steps are performed.

It should be noted that whether the memory occupancy corresponding to the first data processing task is less than the corresponding task type threshold is determined as a prerequisite for determining, based on the first memory occupancy and memory occupancies corresponding to at least some of the plurality of computing nodes, whether to execute the first data processing task, so that it can be quickly determined that the computing resource is not wasted on processing of the first data processing task when the memory occupancy corresponding to the first data processing task is not less than the corresponding task type threshold, thereby improving the speed of processing the data task and saving the computing resource.

In some embodiments, in response to the first memory occupancy being less than the first task type threshold, determining, according to the first memory occupancy and memory occupancies corresponding to at least some of the plurality of computing nodes, whether to execute the first data processing task comprises: in response to the first memory occupancy being less than the first task type threshold, determining, according to memory occupancies of running processes corresponding to the plurality of computing nodes, whether to execute the first data processing task.

Here, the computing node can create a process, and some of the created processes may have been executed, and some are being running. The running process corresponding to the plurality of computing nodes may include running processes in processes created by the plurality of computing nodes. The memory occupancy of the running process may include an occupied memory amount of the first electronic device.

It should be noted that whether to execute the first data processing task is determined based on the memory occupancies of the running processes corresponding to the plurality of computing nodes, so that a process caused by a memory occupancy of the first electronic device exceeding a limit can be forcibly stopped, thereby improving stability of the data service corresponding to the process.

Figure 3:
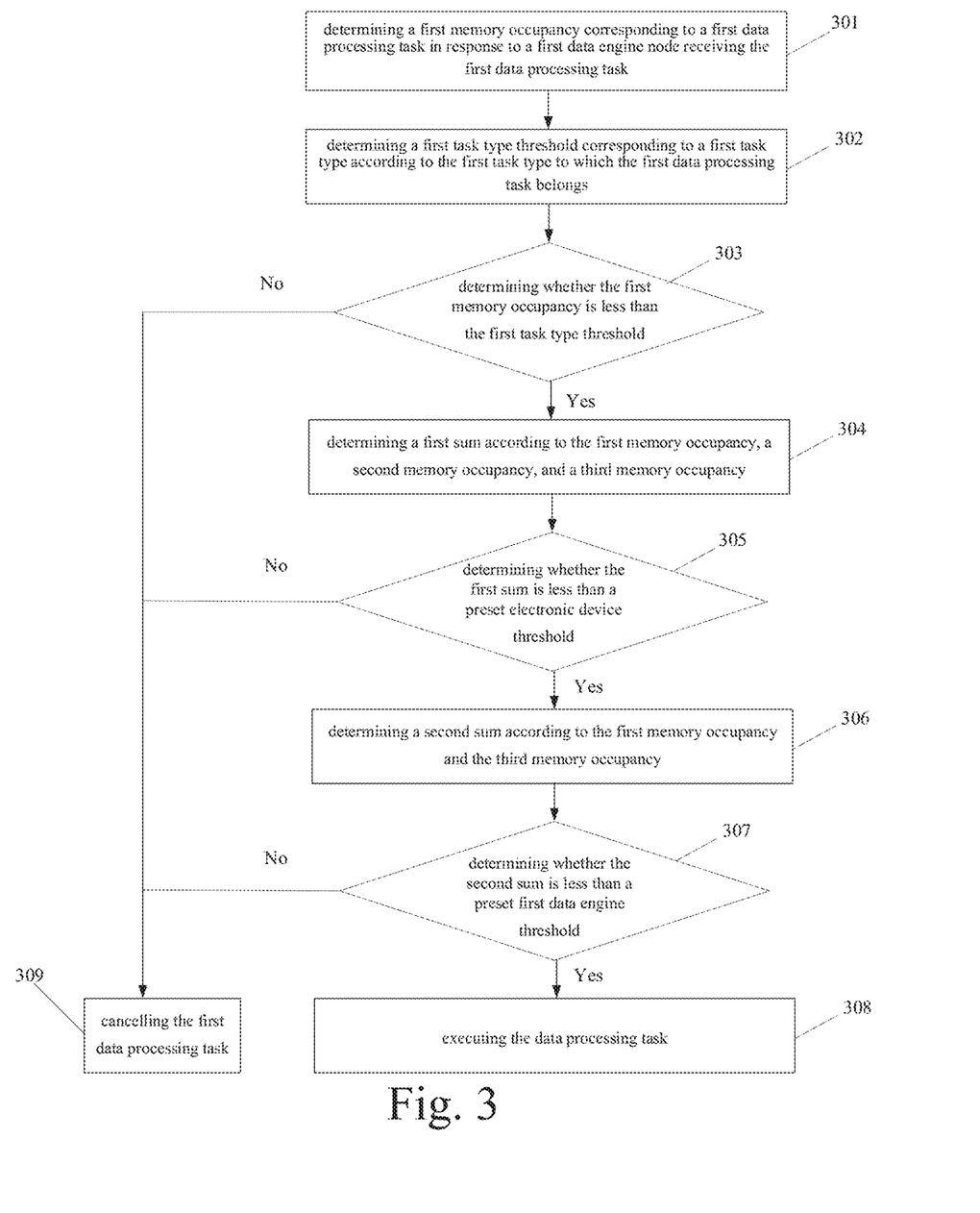
FIG. 3 is a flowchart of a method for executing a data processing task in a cluster mixed deployment scenario according to an embodiment of the present disclosure.

Referring to FIG. 3, FIG. 3 shows a flow of a method for executing a data processing task in a cluster mixed deployment scenario according to an embodiment of the present disclosure. As shown in FIG. 3, the method for executing a data processing task in a cluster mixed deployment scenario includes the following steps.

Step 301: determining a first memory occupancy corresponding to a first data processing task in response to a first data engine node receiving the first data processing task.

Step 302: determining a first task type threshold corresponding to a first task type according to the first task type to which the first data processing task belongs.

Step 303: determining whether the first memory occupancy is less than the first task type threshold.

Step 304: in response to the first memory occupancy being less than the first task type threshold, determining a first sum according to the first memory occupancy, a second memory occupancy, and a third memory occupancy.

The second memory occupancy comprises a memory amount occupied by a running process in processes created by other data engine nodes.

The third memory occupancy comprises a memory amount occupied by a running process in processes created by the first data engine node.

For example, a sum of the first memory occupancy, the second memory occupancy, and the third memory occupancy may be determined as the first sum.

Step 305: determining whether the first sum is less than a preset electronic device threshold.

Step 306: in response to the first sum being less than the preset electronic device threshold, determining a second sum according to the first memory occupancy and the third memory occupancy.

Here, the third memory occupancy comprises a memory amount occupied by running processes of the first data engine node.

It may be understood that before the first data processing task, the first data engine node may have other tasks that are being processed.

For example, a sum of the first memory occupancy and the third memory occupancy may be determined as the second sum.

Step 307: determining whether the second sum is less than a preset first data engine threshold.

Step 308: executing the data processing task in response to the second sum being less than the preset first data engine threshold.

Step 309: cancelling the first data processing task.

After step 303, if the No branch is executed, step 309 is executed. That is, in response to the first memory occupancy being not less than the first task type threshold, the first data processing task is canceled.

After step 305, if the No branch is executed, step 309 is executed. That is, in response to the first sum being not less than the preset electronic device threshold, the first data processing task is canceled.

After step 307, if the No branch is executed, step 309 is executed. That is, in response to the second sum being not less than the preset first data engine threshold, the first data processing task is canceled.

It should be noted that the task execution manner provided in the embodiment corresponding to FIG. 3 first determines a first sum corresponding to computing nodes on a first electronic device; in response to the first sum being less than a preset electronic device threshold, determines a second sum according to the first memory occupancy and a third memory occupancy, and executes the data processing task in response to the second sum being less than a preset first data engine threshold. In this way, the direct influencing factor of memory occupancy of the electronic device that forcibly stops a process can be first determined, thereby improving stability of tasks processed by the plurality of data engines.

Figure 4:
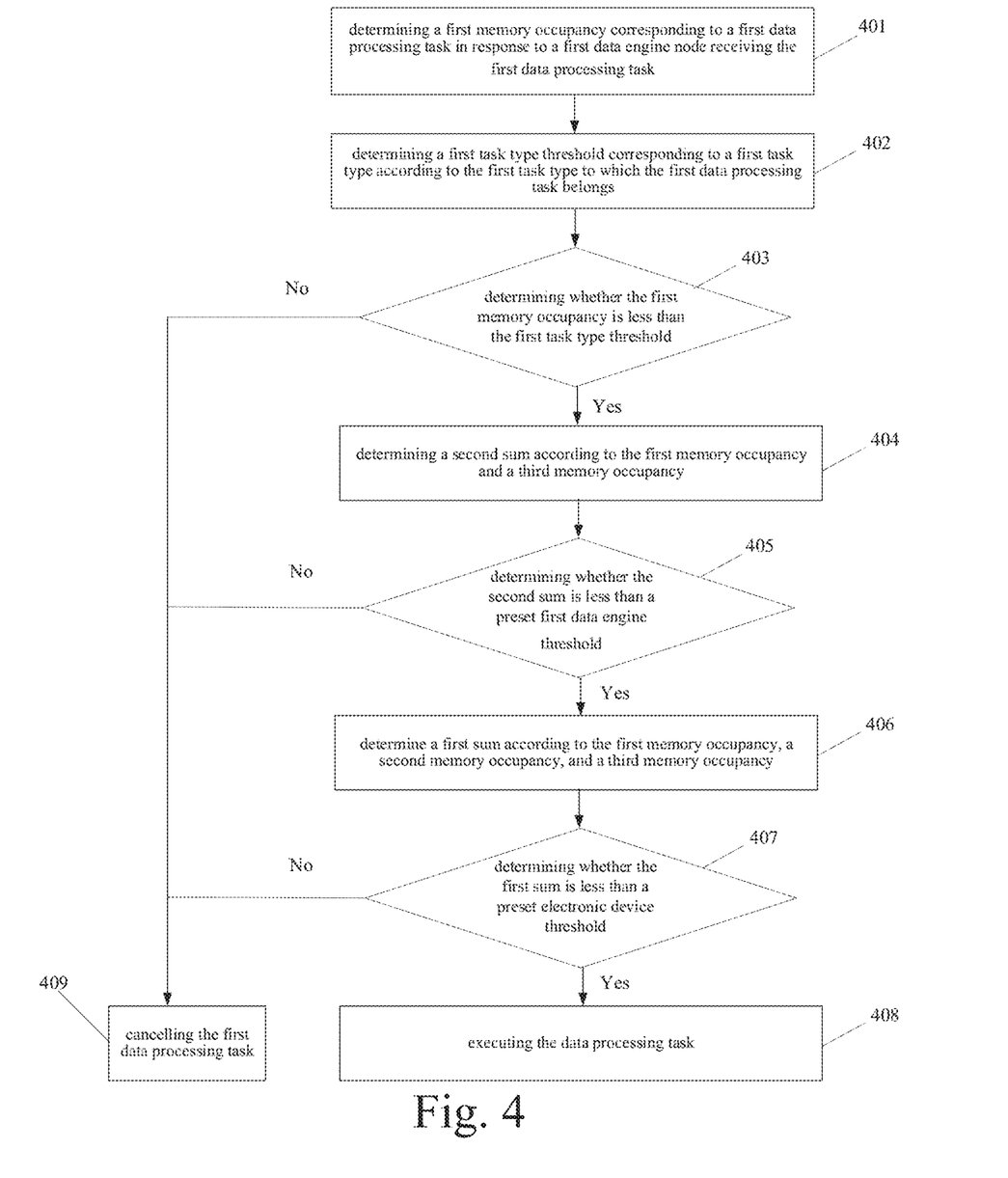
FIG. 4 is a flowchart of a method for executing a data processing task in a cluster mixed deployment scenario according to an embodiment of the present disclosure.

Referring to FIG. 4, FIG. 4 shows a flow of a method for executing a data processing task in a cluster mixed deployment scenario according to an embodiment of the present disclosure. As shown in FIG. 4, the method for executing a data processing task in a cluster mixed deployment scenario includes the following steps.

Step 401: determining a first memory occupancy corresponding to a first data processing task in response to a first data engine node receiving the first data processing task.

Step 402: determining a first task type threshold corresponding to a first task type according to the first task type to which the first data processing task belongs.

Step 403: determining whether the first memory occupancy is less than the first task type threshold.

Step 404: in response to the first memory occupancy being less than the first task type threshold, determining a second sum according to the first memory occupancy and a third memory occupancy.

Here, the third memory occupancy comprises a memory amount occupied by a running process in processes created by the first data engine node.

It should be understood that before the first data processing task, the first data engine node may have other tasks that are being processed.

For example, a sum of the first memory occupancy and the third memory occupancy may be determined as the second sum.

Step 405: determining whether the second sum is less than a preset first data engine threshold.

Step 406: in response to the second sum being less than the preset first data engine threshold, determine a first sum according to the first memory occupancy, a second memory occupancy, and a third memory occupancy.

Here, the second memory occupancy comprises a memory amount occupied by a running process in processes created by other data engine nodes.

For example, a sum of the first memory occupancy, the second memory occupancy, and the third memory occupancy may be determined as the first sum.

Step 407: determining whether the first sum is less than a preset electronic device threshold.

Step 408: executing the data processing task in response to the first sum being less than the preset electronic device threshold. Step 409: cancelling the first data processing task.

After step 403, if the No branch is executed, step 409 is executed. That is, in response to the first memory occupancy being not less than the first task type threshold, the first data processing task is canceled.

After step 405, if the No branch is executed, step 409 is executed. That is, in response to the first sum being not less than the preset electronic device threshold, the first data processing task is canceled.

After step 405, if the No branch is executed, step 409 is executed. That is, in response to the second sum being not less than the preset first data engine threshold, the first data processing task is canceled.

It should be noted that the task execution manner provided in the embodiment corresponding to FIG. 4 determines a memory amount (the third memory occupancy) occupied by a running process of the first data engine; determines a second sum based on the first memory occupancy and the third memory occupancy; then in response to the second sum being less than a preset first data engine threshold, determines a second memory occupancy corresponding to the plurality of computing nodes, where the second memory occupancy comprises a memory amount occupied by a running process in processes created by another data engine node; determines a first sum based on the first memory occupancy, the second memory occupancy, and the third memory occupancy; and executes the data processing task in response to the first sum being less than a preset electronic device threshold. In this way, the condition that has a great impact on task processing of the first data engine can be first determined, and in the case where the condition is met, a task of the first data engine being forcibly stopped due to a memory occupancy of the first data engine exceeding a limit is avoided.

Figure 5:
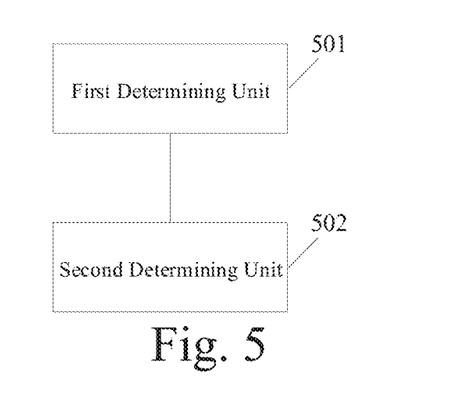
FIG. 5 is a schematic structural diagram of an apparatus for executing a data processing task in a cluster mixed deployment scenario according to an embodiment of the present disclosure.

With further reference to FIG. 5, as an implementation of the method shown in the above described drawings, the present disclosure provides an embodiment of an apparatus for executing a data processing task in a cluster mixed deployment scenario. The apparatus embodiment corresponds to the method embodiment shown in FIG. 1. The apparatus may be specifically applied to various electronic devices. A first electronic device is provided with computing nodes of at least two data engines.

As shown in FIG. 5, the apparatus for executing a data processing task in a cluster mixed deployment scenario in this embodiment includes: a first determining unit 501 and a second determining unit 502. The first determining unit 501 is configured to determine, in response to a first data engine node receiving a first data processing task, a first memory occupancy corresponding to the first data processing task, wherein the first data engine node is deployed on a first electronic device and belongs to a first data engine; and the second determining unit 502 is configured to determine whether to execute the first data processing task based on a second memory occupancy corresponding to another data engine node, wherein the another data engine node is deployed on the first electronic device and belongs to another data engine other than the first data engine in the at least two data engines.

In this embodiment, specific processing of the first determining unit 501 and the second determining unit 502 in the apparatus for executing a data processing task in a cluster mixed deployment scenario and the technical effect brought about thereby can respectively refer to related descriptions of step 101 and step 102 in the corresponding embodiment in FIG. 1, and are not described herein again.

In some embodiments, determining whether to execute the first data processing task based on a second memory occupancy corresponding to another data engine node comprises: determining the second memory occupancy and determining a third memory occupancy corresponding to the first data engine node, wherein the second memory occupancy comprises a memory amount occupied by a running process in processes created by another data engine node, and the third memory occupancy comprises a memory amount occupied by a running process in processes created by the first data engine node; and determining whether to execute the first data processing task based on the second memory occupancy and the third memory occupancy.

In some embodiments, memory occupancies of the at least two data engines deployed on the first electronic device are determined through a first step. The first step comprises: performing an acquisition step at preset time intervals, where the acquisition step comprises: determining, in processes running on the first electronic device, running processes created by the computing nodes of the data engines; summing, according to the computing nodes to which the running processes belong, memory amounts occupied by the determined running processes to obtain memory occupancies corresponding to respective computing nodes; summing memory amounts corresponding to the computing nodes according to the data engines to which the computing nodes belong; and storing memory occupancies corresponding to respective data engines that are obtained in each acquisition step.

In some embodiments, determining the second memory occupancy and determining a third memory occupancy corresponding to the first data engine node comprises: in response to the first data engine node receiving the first data processing task, obtaining memory occupancies corresponding to respective data engines that are determined based on an acquisition step that is closest to the current time.

In some embodiments, the first data engine is an online analytical processing engine.

In some embodiments, determining whether to execute the first data processing task based on the second memory occupancy and the third memory occupancy comprises: determining a first sum based on the first memory occupancy, the second memory occupancy, and a third memory occupancy; in response to the first sum being less than a preset electronic device threshold, determining a second sum based on the first memory occupancy and the third memory occupancy; and executing the first data processing task in response to the second sum being less than a preset first data engine threshold.

In some embodiments, determining whether to execute the first data processing task based on the second memory occupancy and the third memory occupancy comprises: determining a second sum based on the first memory occupancy and the third memory occupancy; in response to the second sum being less than the preset first data engine threshold, determining a first sum based on the first memory occupancy, a second memory occupancy, and the third memory occupancy; and executing the first data processing task in response to the first sum being less than the preset electronic device threshold.

In some embodiments, determining whether to execute the first data processing task based on the second memory occupancy and the third memory occupancy comprises: canceling the first data processing task in response to the first sum being not less than the preset electronic device threshold; and/or, canceling the first data processing task in response to the second sum being not less than the preset first data engine threshold.

In some embodiments, before determining whether to execute the first data processing task based on a second memory occupancy corresponding to another data engine node, the method further comprises: determining a first task type threshold corresponding to a first task type based on the first task type to which the first data processing task belongs; and in response to the first memory occupancy being less than the first task type threshold, determining whether to execute the first data processing task based on the second memory occupancy corresponding to the another data engine node.

Figure 6:
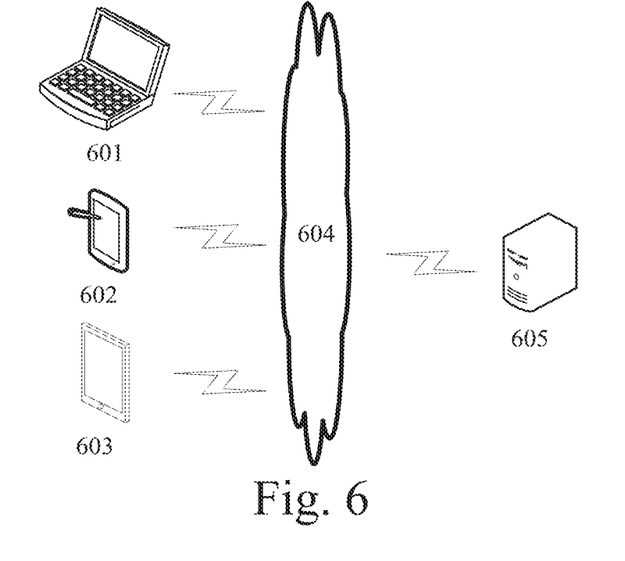
FIG. 6 is a schematic diagram of an exemplary system architecture to which a method for executing a data processing task in a cluster mixed deployment scenario according to an embodiment of the present disclosure may be applied.

Referring to FIG. 6, FIG. 6 shows an example system architecture to which a method for executing a data processing task in a cluster mixed deployment scenario according to an embodiment of the present disclosure may be applied.

As shown in FIG. 6, the system architecture may include terminal devices 601, 602, and 603, a network 604, and a server 605. The network 604 is configured to provide a medium for a communication link between the terminal devices 601, 602, and 603 and the server 605. The network 604 may include various connection types, for example, a wired or wireless communication link, or an optical fiber cable, etc.

The terminal devices 601, 602, and 603 may interact with the server 605 through the network 604 to receive or send messages. Various client applications, for example, a web browser application, a search application, or a news information application, may be installed on the terminal devices 601, 602, and 603. A client application on the terminal devices 601, 602, and 603 may receive an instruction from a user, and complete a corresponding function based on the instruction from the user, for example, add corresponding information to information based on the instruction from the user.

The terminal devices 601, 602, and 603 may be hardware or software. When the terminal devices 601, 602, and 603 are hardware, the terminal devices may be various electronic devices that have a display screen and support web browsing, including but not limited to a smartphone, a tablet computer, an e-book reader, a moving picture experts group audio layer III (MP3) player, a moving picture experts group audio layer IV (MP4) player, a laptop computer, or a desktop computer. When the terminal devices 601, 602, and 603 are software, the terminal devices may be installed in the foregoing enumerated electronic devices, and the terminal devices may be implemented as multiple software or software modules (for example, software or software modules that provide distributed services), or may be implemented as a single software or software module. This is not specifically limited herein.

The server 605 may be a server that provides various services. For example, the server 605 receives an information obtaining request sent by the terminal devices 601, 602, and 603, and obtains display information corresponding to the information obtaining request in various manners based on the information obtaining request. The server 605 sends related data of the display information to the terminal devices 601, 602, and 603.

It should be noted that the method for executing a data processing task in a cluster mixed deployment scenario provided by the embodiments of the present disclosure may be performed by the terminal device. Correspondingly, the apparatus for executing a data processing task in a cluster mixed deployment scenario may be disposed in the terminal devices 601, 602, and 603. In addition, the method for executing a data processing task in a cluster mixed deployment scenario provided by the embodiments of the present disclosure may also be performed by the server 605. Correspondingly, the apparatus for executing a data processing task in a cluster mixed deployment scenario may be disposed in the server 605.

It should be understood that the numbers of terminal devices, the network, and the server in FIG. 6 are merely schematic. Depending on requirements, there may be any number of terminal devices, networks, and servers.

Figure 7:
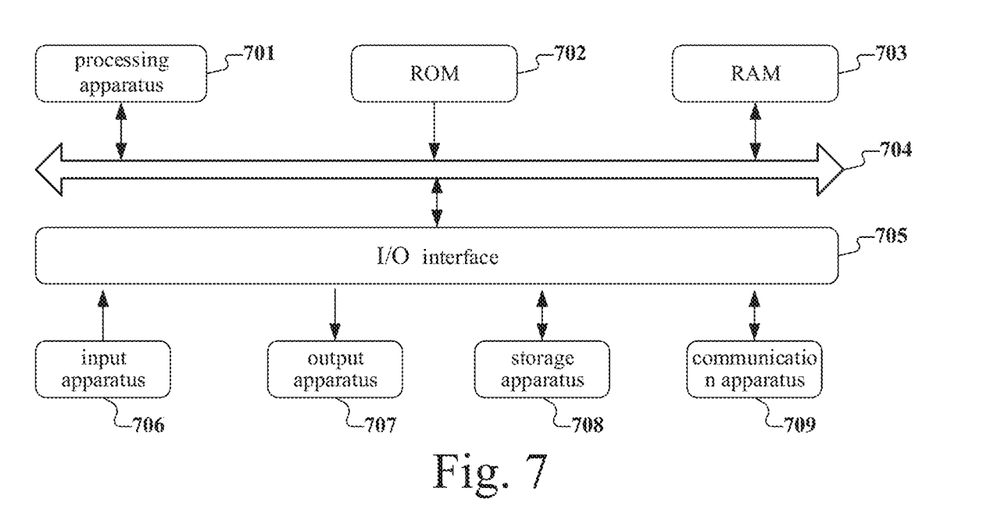
FIG. 7 is a schematic diagram of a basic structure of an electronic device provided by an embodiment of the present disclosure.

Referring to FIG. 7 below, FIG. 7 is a schematic diagram of a structure suitable for implementing an electronic device (for example, the terminal device or the server in FIG. 6) of the embodiments of the present disclosure. The terminal device in the embodiments of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (for example, a vehicle navigation terminal), and fixed terminals such as a digital TV and a desktop computer. The electronic device shown in FIG. 7 is merely an example, and shall not impose any limitation on the function and scope of use of the embodiments of the present disclosure.

As shown in FIG. 7, the electronic device may include a processing apparatus (for example, a central processing unit, a graphics processing unit, etc.) 701 that may perform a variety of appropriate actions and processing in accordance with a program stored in a read-only memory (ROM) 702 or a program loaded from a storage apparatus 708 into a random access memory (RAM) 703. The RAM 703 further stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touchpad, a keyboard, a mouse, a camera, a microphone, an accelerometer, and a gyroscope; an output apparatus 707 including, for example, a liquid crystal display (LCD), a speaker, and a vibrator; the storage apparatus 708 including, for example, a tape and a hard disk; and a communication apparatus 709. The communication apparatus 709 may allow the electronic device to perform wireless or wired communication with other devices to exchange data. Although FIG. 7 shows the electronic device having various apparatuses, it should be understood that it is not required to implement or have all of the shown apparatuses. It may be an alternative to implement or have more or fewer apparatuses.

In particular, according to the embodiments of the present disclosure, the process described above with reference to the flowcharts may be implemented as a computer software program. For example, the embodiments of the present disclosure include a computer program product, which includes a computer program carried on a non-transitory computer-readable medium, where the computer program includes program code for performing the method shown in the flowchart. In such an embodiment, the computer program may be downloaded from a network through the communication apparatus 709 and installed, installed from the storage apparatus 708, or installed from the ROM 702. When the computer program is executed by the processing apparatus 701, the above-mentioned functions defined in the method of the embodiments of the present disclosure are performed.

It should be noted that the foregoing computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, where the computer-readable program code is carried. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, the client and the server may communicate using any currently known or future-developed network protocol such as a hypertext transfer protocol (HTTP), and may be connected to a digital data communication (for example, a communication network) in any form or medium. Examples of the communication network include a local area network (LAN), a wide area network (WAN), an internetwork (for example, the Internet), a peer-to-peer network (for example, an ad hoc peer-to-peer network), and any currently known or future-developed network.

The foregoing computer-readable medium may be contained in the foregoing electronic device. Alternatively, the computer-readable medium exists independently, without being assembled into the electronic device.

The foregoing computer-readable medium carries one or more programs that, when executed by the electronic device, cause the electronic device that is provided with computing nodes of at least two data engines to: determine, in response to a first data engine node receiving a first data processing task, a first memory occupancy corresponding to the first data processing task, wherein the first data engine node is deployed on a first electronic device and belongs to a first data engine; and determine whether to execute the first data processing task based on a second memory occupancy corresponding to another data engine node, wherein the another data engine node is deployed on the first electronic device and belongs to another data engine other than the first data engine in the at least two data engines.

The computer program code for performing the operations of the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user through any type of network, including a local area network (LAN) or a wide area network (WAN), or may be connected to an external computer (for example, connected through the Internet using an Internet service provider).

The flowcharts and block diagrams in the accompanying drawings illustrate the possible system architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession may actually be executed substantially in parallel, or they may sometimes be executed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. The name of the unit does not constitute a limitation on the unit itself in some cases. For example, the first determining unit may also be described as "a unit for determining a first memory occupancy".

The functions described herein above may be performed at least partially by one or more hardware logic components. For example, without limitation, exemplary types of hardware logic components that may be used include: a field-programmable gate array (FPGA), an application-specific integrated circuit (ASIC), an application-specific standard product (ASSP), a system on chip (SOC), a complex programmable logic device (CPLD), and the like.

In the context of the present disclosure, the machine-readable medium may be a tangible medium, which may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. A person skilled in the art should understand that the scope of disclosure involved in the present disclosure is not limited to the technical solution formed by a specific combination of the foregoing technical features, and shall also cover other technical solutions formed by any combination of the foregoing technical features or equivalent features thereof without departing from the foregoing concept of disclosure, for example, a technical solution formed by replacing the foregoing features with technical features disclosed in the present disclosure (but not limited to) and having similar functions.

In addition, although the operations are depicted in a specific order, it should not be understood as requiring these operations to be performed in the specific order shown or in a sequential order. Under specific circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment can also be implemented in a plurality of embodiments individually or in any suitable combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A method for executing a data processing task in a cluster mixed deployment scenario, wherein a first electronic device is provided with computing nodes, and the computing nodes belong to at least two data engines, the first electronic device comprises a memory, and the method comprises:
   in response to a first data engine node receiving the data processing task, determining, by the first electronic device, a first occupancy of the memory corresponding to the data processing task, wherein the first data engine node is deployed on the first electronic device and belongs to a first data engine, and the first data engine node is one of the computing nodes; and
   determining, by the first electronic device, whether to execute the data processing task based on a second occupancy of the memory corresponding to another data engine node, wherein the another data engine node is deployed on the first electronic device and belongs to another data engine other than the first data engine in the at least two data engines,
   wherein determining, by the first electronic device, whether to execute the data processing task based on the second occupancy of the memory corresponding to the another data engine node comprises:
      determining the second occupancy of the memory and determining a third occupancy of the memory corresponding to the first data engine node, wherein the second occupancy of the memory comprises a memory amount occupied by a running process in processes created by the another data engine node, and the third occupancy of the memory comprises a memory amount occupied by a running process in processes created by the first data engine node; and
      determining whether to execute the data processing task based on the second occupancy of the memory and the third occupancy of the memory,
   wherein determining whether to execute the data processing task based on the second occupancy of the memory and the third occupancy of the memory comprises:
      determining a first sum based on the first occupancy of the memory, the second occupancy of the memory, and the third occupancy of the memory;
      in response to the first sum being less than a preset electronic device threshold, determining a second sum based on the first occupancy of the memory and the third occupancy of the memory; and
      executing the data processing task in response to the second sum being less than a preset first data engine threshold,
      or,
      determining a second sum based on the first occupancy of the memory and the third occupancy of the memory;
      in response to the second sum being less than a preset first data engine threshold, determining a first sum based on the first occupancy of the memory, the second occupancy of the memory, and the third occupancy of the memory; and
      executing the data processing task in response to the first sum being less than a preset electronic device threshold.

2. The method according to claim 1, wherein memory occupancies of the at least two data engines deployed on the first electronic device are determined through a first step, the first step comprising:
   performing an acquisition step at preset time intervals, and the acquisition step comprises:
      determining running processes created by the computing nodes of the at least two data engines in processes running on the first electronic device;
      summing, according to the computing nodes to which the running processes belong, memory amounts occupied by determined running processes to obtain memory occupancies corresponding to respective computing nodes; and
      summing the memory occupancies corresponding to the respective computing nodes according to data engines to which the respective computing nodes belong; and
   storing memory occupancies corresponding to respective data engines that are obtained in each acquisition step.

3. The method according to claim 2, wherein determining the second occupancy of the memory and determining the third occupancy of the memory corresponding to the first data engine node comprises:
   in response to the first data engine node receiving the data processing task, determining a target acquisition step that is closest to current time;
   obtaining the memory occupancies corresponding to respective data engines that are determined in the target acquisition step; and
   determining the second occupancy of the memory and the third occupancy of the memory according to the memory occupancies corresponding to respective data engines that are determined in the target acquisition step.

4. The method according to claim 1, wherein the first data engine is an online analytical processing engine.

5. The method according to claim 1, wherein determining whether to execute the data processing task based on the second occupancy of the memory and the third occupancy of the memory comprises:
   in response to the first sum being not less than the preset electronic device threshold, canceling the data processing task; and/or in response to the second sum being not less than the preset first data engine threshold, canceling the data processing task.

6. The method according to claim 1, wherein before determining, by the first electronic device, whether to execute the data processing task based on the second occupancy of the memory corresponding to the another data engine node, the method further comprises:
  determining a first task type threshold corresponding to a first task type according to the first task type to which the data processing task belongs; and
  in response to the first occupancy of the memory being less than the first task type threshold, determining whether to execute the data processing task based on the second occupancy of the memory corresponding to the another data engine node.

7. The method according to claim 1, wherein determining whether to execute the data processing task based on the second occupancy of the memory and the third occupancy of the memory comprises:
  in response to the first sum being not less than the preset electronic device threshold, canceling the data processing task; and/or
  in response to the second sum being not less than the preset first data engine threshold, canceling the data processing task.

8. An electronic device, comprising:
  one or more processors; and
  a storage apparatus, storing one or more programs,
  wherein the one or more programs, when executed by the one or more processors, cause the one or more processors to implement a method for executing a data processing task in a cluster mixed deployment scenario,
  wherein a first electronic device is provided with computing nodes, and the computing nodes belong to at least two data engines, the first electronic device comprises a memory, and the method comprises:
  in response to a first data engine node receiving the data processing task, determining, by the first electronic device, a first occupancy of the memory corresponding to the data processing task, wherein the first data engine node is deployed on the first electronic device and belongs to a first data engine, and the first data engine node is one of the computing nodes; and
  determining, by the first electronic device, whether to execute the data processing task based on a second occupancy of the memory corresponding to another data engine node, wherein the another data engine node is deployed on the first electronic device and belongs to another data engine other than the first data engine in the at least two data engines,
  wherein determining, by the first electronic device, whether to execute the data processing task based on the second occupancy of the memory corresponding to the another data engine node comprises:
    determining the second occupancy of the memory and determining a third occupancy of the memory corresponding to the first data engine node, wherein the second occupancy of the memory comprises a memory amount occupied by a running process in processes created by the another data engine node, and the third occupancy of the memory comprises a memory amount occupied by a running process in processes created by the first data engine node; and
    determining whether to execute the data processing task based on the second occupancy of the memory and the third occupancy of the memory,
  wherein determining whether to execute the data processing task based on the second occupancy of the memory and the third occupancy of the memory comprises:
    determining a first sum based on the first occupancy of the memory, the second occupancy of the memory, and the third occupancy of the memory;
    in response to the first sum being less than a preset electronic device threshold, determining a second sum based on the first occupancy of the memory and the third occupancy of the memory; and
    executing the data processing task in response to the second sum being less than a preset first data engine threshold,
    or,
    determining a second sum based on the first occupancy of the memory and the third occupancy of the memory;
    in response to the second sum being less than a preset first data engine threshold, determining a first sum based on the first occupancy of the memory, the second occupancy of the memory, and the third occupancy of the memory; and
    executing the data processing task in response to the first sum being less than a preset electronic device threshold.

9. The electronic device according to claim 8, wherein memory occupancies of the at least two data engines deployed on the first electronic device are determined through a first step, the first step comprising:
  performing an acquisition step at preset time intervals, and the acquisition step comprises:
    determining running processes created by the computing nodes of the at least two data engines in processes running on the first electronic device;
    summing, according to the computing nodes to which the running processes belong, memory amounts occupied by determined running processes to obtain memory occupancies corresponding to respective computing nodes; and
    summing the memory occupancies corresponding to the respective computing nodes according to data engines to which the respective computing nodes belong; and
  storing memory occupancies corresponding to respective data engines that are obtained in each acquisition step.

10. The electronic device according to claim 9, wherein determining the second occupancy of the memory and determining the third occupancy of the memory corresponding to the first data engine node comprises:
  in response to the first data engine node receiving the data processing task, determining a target acquisition step that is closest to current time;
  obtaining the memory occupancies corresponding to respective data engines that are determined in the target acquisition step; and
  determining the second occupancy of the memory and the third occupancy of the memory according to the memory occupancies corresponding to respective data engines that are determined in the target acquisition step.

11. The electronic device according to claim 8, wherein the first data engine is an online analytical processing engine.

12. The electronic device according to claim 8, wherein determining whether to execute the data processing task based on the second occupancy of the memory and the third occupancy of the memory comprises:

in response to the first sum being not less than the preset electronic device threshold, canceling the data processing task; and/or in response to the second sum being not less than the preset first data engine threshold, canceling the data processing task.

13. The electronic device according to claim 8, wherein before determining whether to execute the data processing task based on the second occupancy of the memory corresponding to the another data engine node, the method further comprises:

determining a first task type threshold corresponding to a first task type according to the first task type to which the data processing task belongs; and in response to the first occupancy of the memory being less than the first task type threshold, determining whether to execute the data processing task based on the second occupancy of the memory corresponding to the another data engine node.

14. A non-transitory computer-readable storage medium, wherein a computer program is stored on the non-transitory computer-readable storage medium, the program, when executed by a processor, implements a method for executing a data processing task in a cluster mixed deployment scenario, wherein a first electronic device is provided with computing nodes, and the computing nodes belong to at least two data engines, the first electronic device comprises a memory, and the method comprises:

in response to a first data engine node receiving the data processing task, determining, by the first electronic device, a first occupancy of the memory corresponding to the data processing task, wherein the first data engine node is deployed on the first electronic device and belongs to a first data engine, and the first data engine node is one of the computing nodes; and determining, by the first electronic device, whether to execute the data processing task based on a second occupancy of the memory corresponding to another data engine node, wherein the another data engine node is deployed on the first electronic device and belongs to another data engine other than the first data engine in the at least two data engines, wherein determining, by the first electronic device, whether to execute the data processing task based on the second occupancy of the memory corresponding to the another data engine node comprises:

determining the second occupancy of the memory and determining a third occupancy of the memory corresponding to the first data engine node, wherein the second occupancy of the memory comprises a memory amount occupied by a running process in processes created by the another data engine node, and the third occupancy of the memory comprises a memory amount occupied by a running process in processes created by the first data engine node; and determining whether to execute the data processing task based on the second occupancy of the memory and the third occupancy of the memory, wherein determining whether to execute the data processing task based on the second occupancy of the memory and the third occupancy of the memory comprises:

determining a first sum based on the first occupancy of the memory, the second occupancy of the memory, and the third occupancy of the memory;

in response to the first sum being less than a preset electronic device threshold, determining a second sum based on the first occupancy of the memory and the third occupancy of the memory; and executing the data processing task in response to the second sum being less than a preset first data engine threshold, or, determining a second sum based on the first occupancy of the memory and the third occupancy of the memory;

in response to the second sum being less than a preset first data engine threshold, determining a first sum based on the first occupancy of the memory, the second occupancy of the memory, and the third occupancy of the memory; and executing the data processing task in response to the first sum being less than a preset electronic device threshold.

* * * * *